(12) United States Patent
Watanabe

(10) Patent No.: US 10,317,630 B2
(45) Date of Patent: Jun. 11, 2019

(54) TAB FOR OPTICAL CONNECTOR ENGAGEMENT AND DISENGAGEMENT

(71) Applicant: SANWA DENKI KOGYO CO., LTD., Tokyo (JP)

(72) Inventor: Yasuhiro Watanabe, Tokyo (JP)

(73) Assignee: SANWA DENKI KOGYO CO., LTD., Tokyo (JP)

( * ) Notice: Subject to any disclaimer, the term of this patent is extended or adjusted under 35 U.S.C. 154(b) by 0 days.

(21) Appl. No.: 16/111,316

(22) Filed: Aug. 24, 2018

(65) Prior Publication Data

US 2019/0079252 A1 Mar. 14, 2019

(30) Foreign Application Priority Data

Sep. 13, 2017 (JP) ................. 2017-175656

(51) Int. Cl.
 *G02B 6/38* (2006.01)
(52) U.S. Cl.
 CPC ......... *G02B 6/3898* (2013.01); *G02B 6/3885* (2013.01); *G02B 6/3893* (2013.01); *G02B 6/3825* (2013.01)
(58) Field of Classification Search
 CPC .................................................. G02B 6/3898
 See application file for complete search history.

(56) References Cited

U.S. PATENT DOCUMENTS

| 9,052,474 | B2 | 6/2015 | Jiang et al. |
| 9,103,996 | B2 | 8/2015 | Lin |
| 9,239,437 | B2 | 1/2016 | Belenkiy et al. |
| 9,739,955 | B2 * | 8/2017 | Lee ........ G02B 6/3893 |
| 10,054,747 | B2 * | 8/2018 | Lee ........ G02B 6/3893 |
| 10,107,969 | B2 * | 10/2018 | Childers ........ G02B 6/3885 |
| 2011/0317976 | A1 | 12/2011 | Eckstein et al. |
| 2015/0212283 | A1 | 7/2015 | Jiang et al. |
| 2016/0109661 | A1 | 4/2016 | Foung |
| 2016/0116686 | A1 | 4/2016 | Durrant et al. |
| 2016/0327757 | A1 * | 11/2016 | Lee ........ G02B 6/3893 |
| 2017/0299820 | A1 * | 10/2017 | Lee ........ G02B 6/3893 |
| 2018/0081129 | A1 * | 3/2018 | Kaga ........ G02B 6/3898 |
| 2019/0079252 | A1 * | 3/2019 | Watanabe ........ G02B 6/3898 |

FOREIGN PATENT DOCUMENTS

| JP | H0720354 A | 1/1995 |
| JP | 2003004974 A | 1/2003 |
| JP | 2004233403 A | 8/2004 |
| JP | 2012088365 A | 5/2012 |

OTHER PUBLICATIONS

European Search Report in corresponding European Application No. 18191629.7, dated Jan. 24, 2019.

* cited by examiner

*Primary Examiner* — Andrew Jordan
(74) *Attorney, Agent, or Firm* — Bacon & Thomas, PLLC

(57) ABSTRACT

Provided is a tab (2) including operating member (3) which is provided with an engaging part (5a) at a tip of a plurality of arms (5) so as to detachably attach and hold in each of a plurality of engaging holes (13a) formed at the rear end of a coupling (13), and gripping member (4) which is extendingly provided from the back of the operating member (3), wherein the coupling (13) advances and retreats 3 with respect to a housing (18) by an operation of the operating member (3) in association with the advance and retreat of the gripping member (4), and forward pressing or backward pressing of the plug body (1) is released.

11 Claims, 15 Drawing Sheets

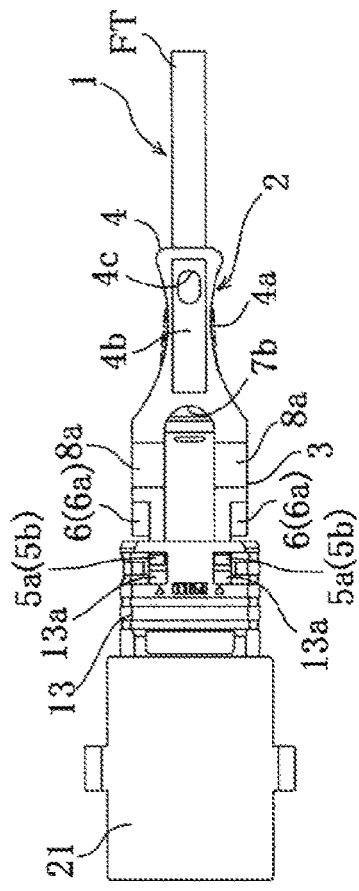
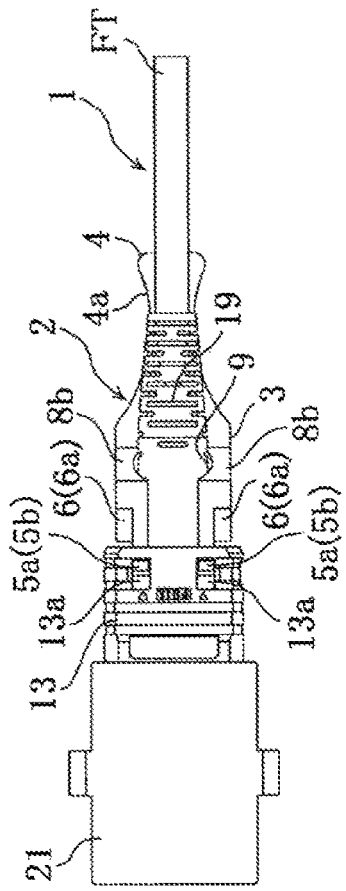
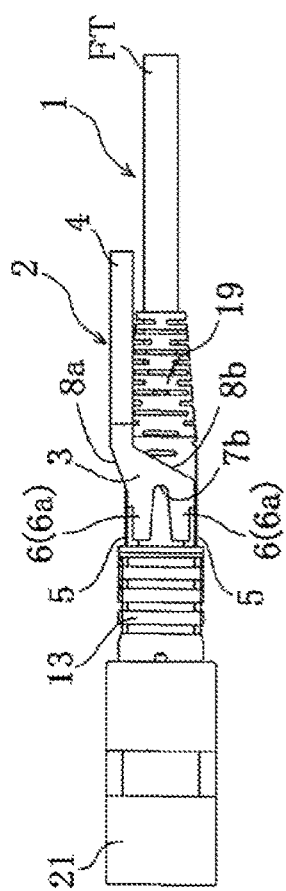
FIG. 5A
FIG. 5B
FIG. 5C

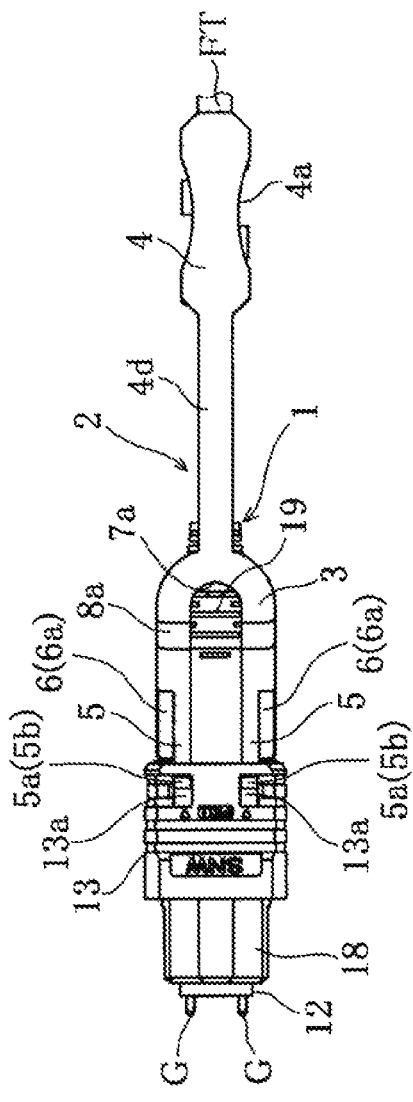
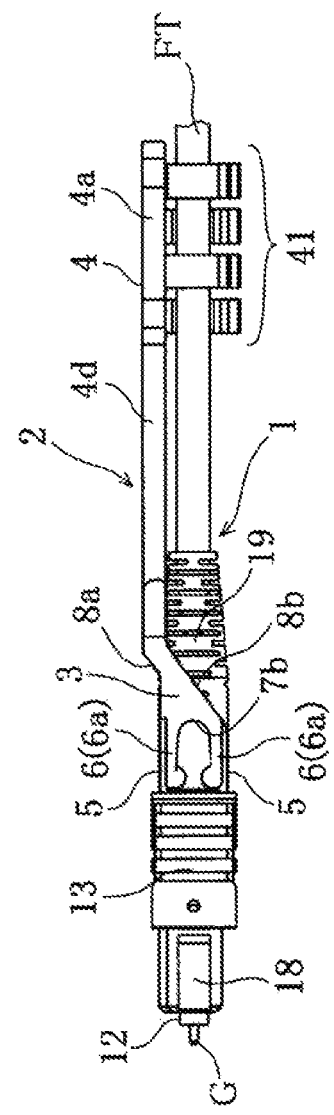
FIG. 8A
FIG. 8B

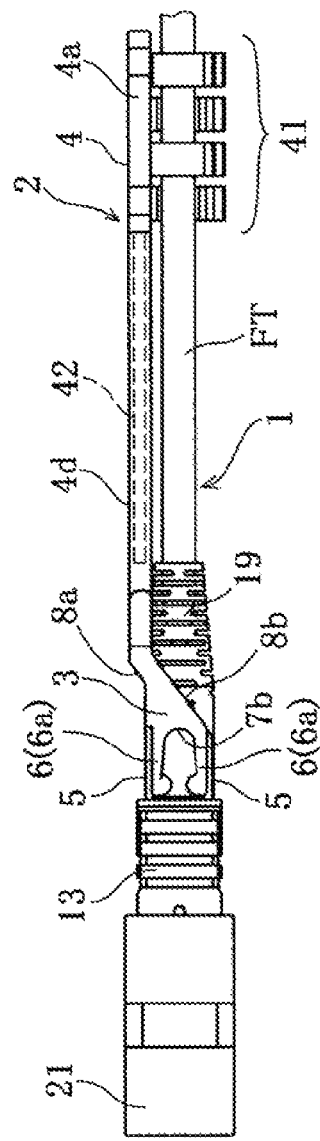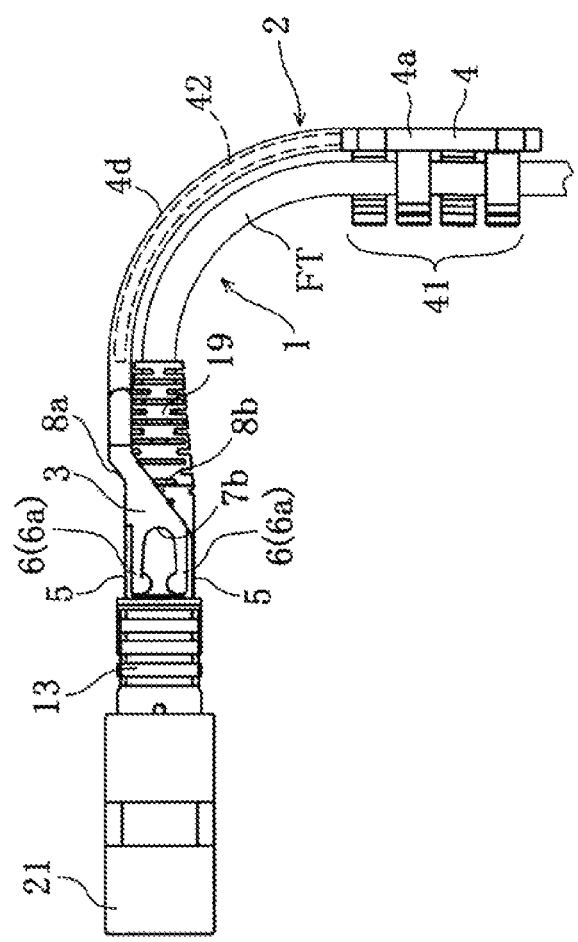
FIG. 9A
FIG. 9B

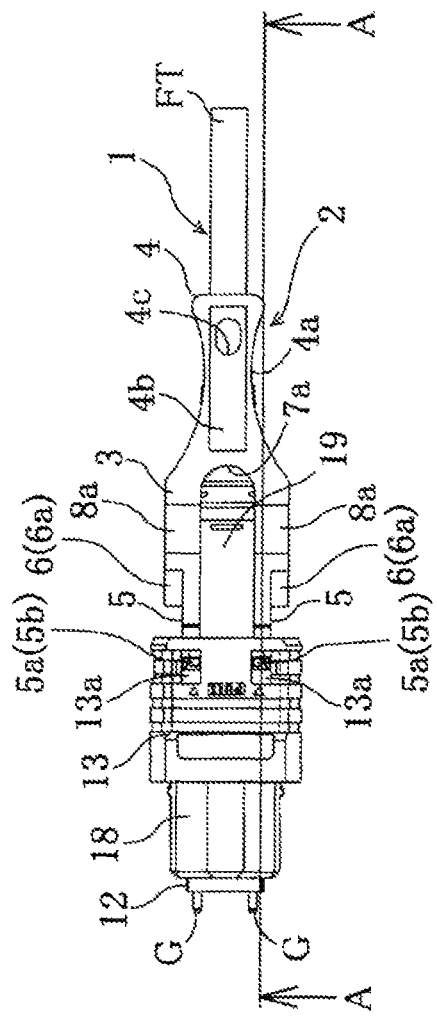
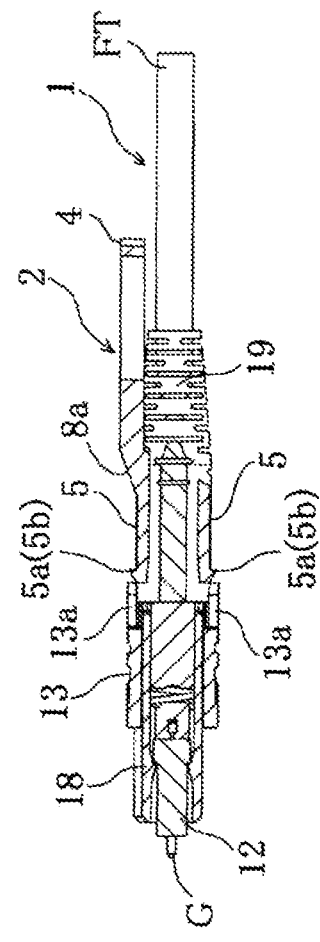
*FIG. 10A*
*FIG. 10B*

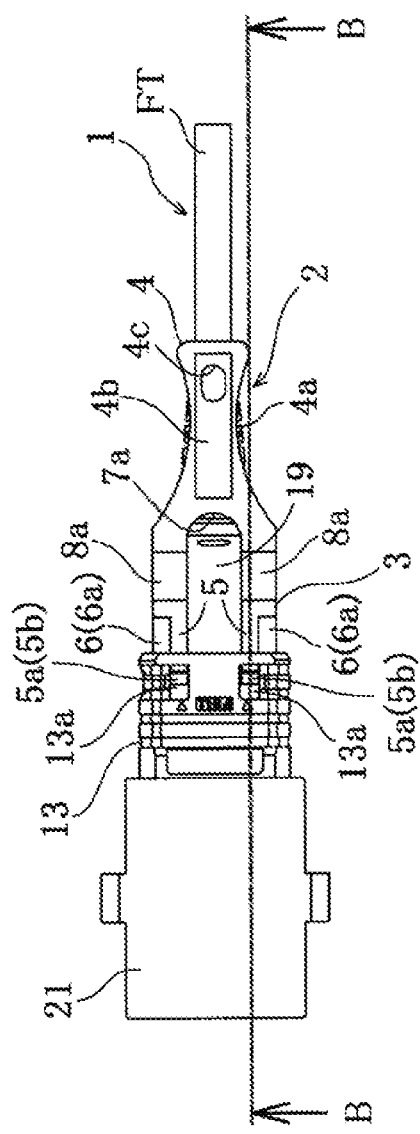
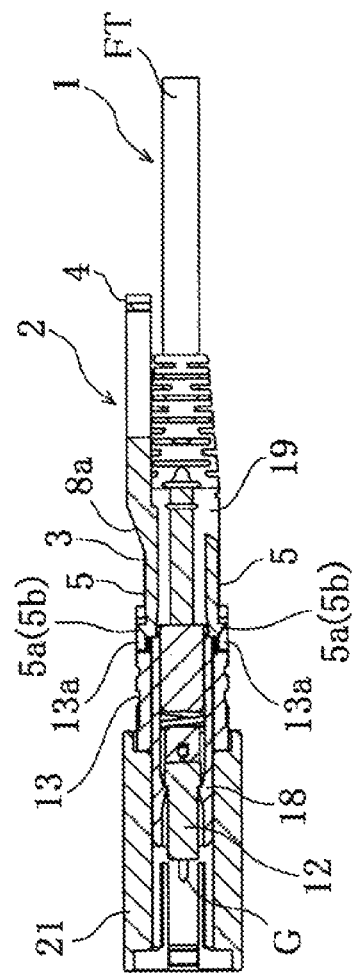
FIG. 11A
FIG. 11B

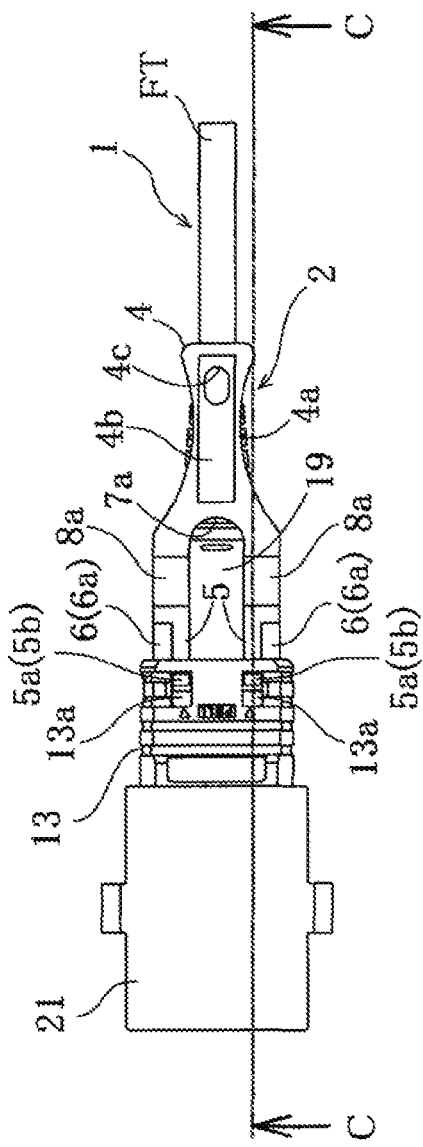
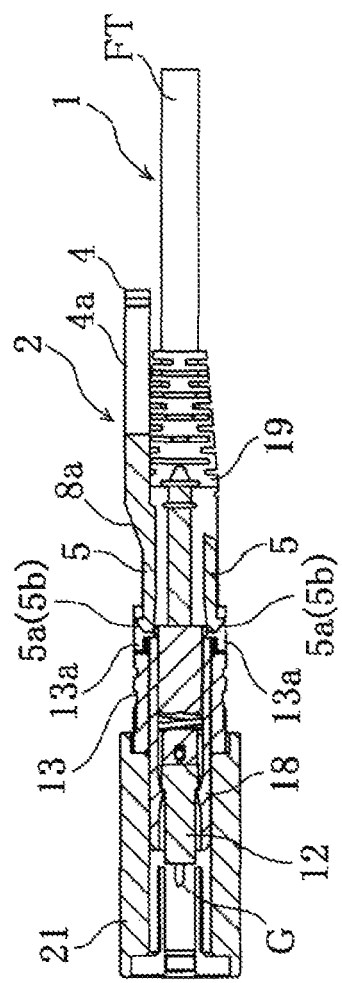
FIG. 12A
FIG. 12B

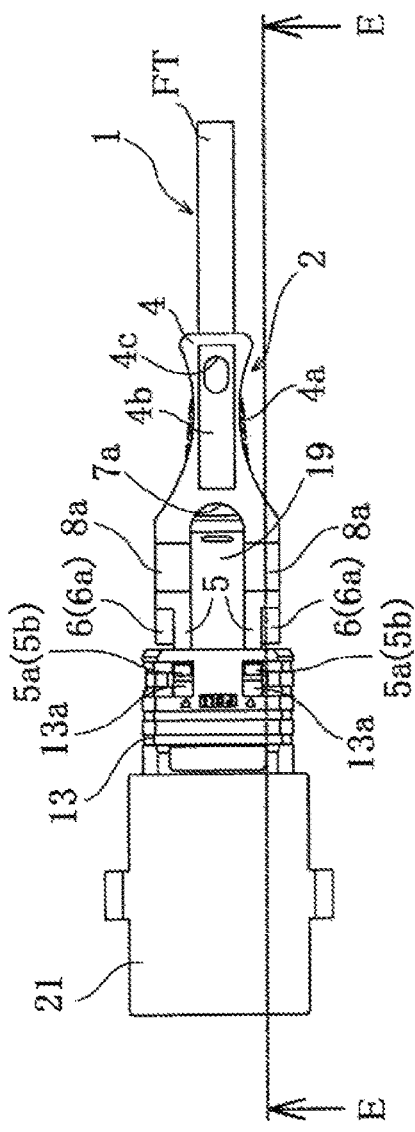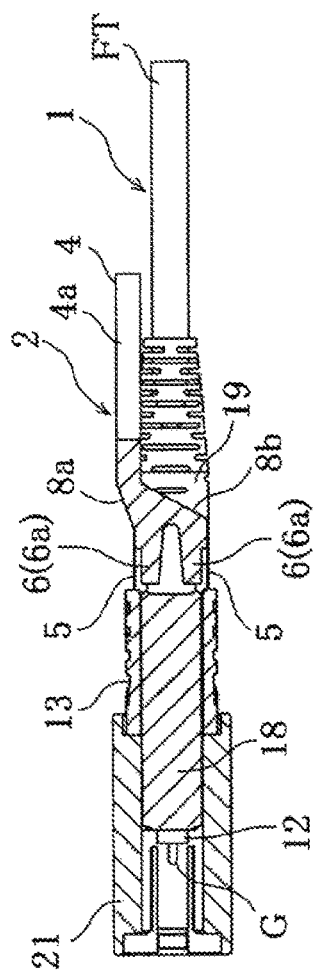
FIG. 14A
FIG. 14B

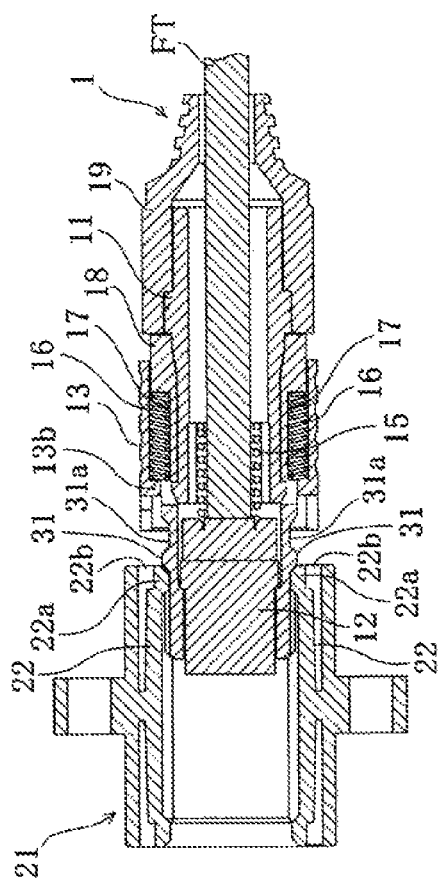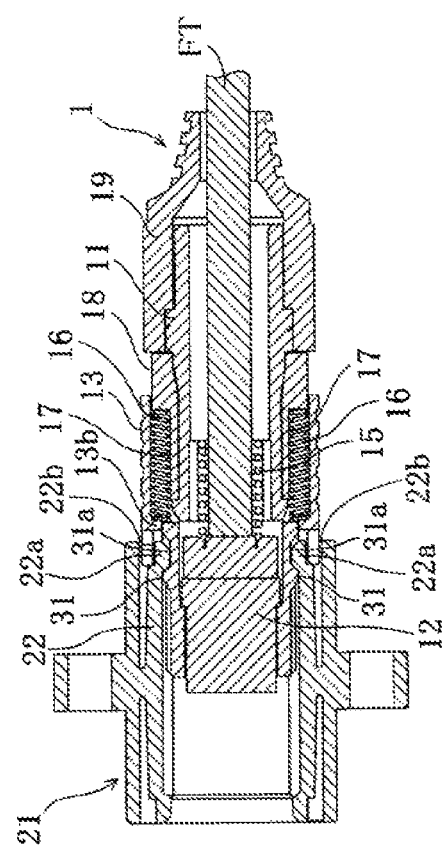
FIG. 17A
FIG. 17B

TAB FOR OPTICAL CONNECTOR ENGAGEMENT AND DISENGAGEMENT

TECHNICAL FIELD

The present invention relates to a tab for optical connector suitable for disengageably attaching a plug body of a MPO type push-pull system optical connector plug (hereinafter, referred to as a plug body) to be mainly connected to an optical connector adaptor (hereinafter, referred to as an adaptor).

BACKGROUND ART

In view of the improvement of connection workability of an optical connector ferrule, it has been recently provided a so-called MPO connector (optical connector having a structure in which a multi-core connector ferrule, which is stipulated in the JIS-C5982 standard etc., is received within a plastic housing).

Conventionally, as shown in FIGS. 17A and 17B to be described later, the MPO type plug body 1 receives at the end (front end) of a sleeve-like housing 18 a ferrule 12 which is fitted to a head of a multi-core optical fiber cord FT. Within the housing 18, there is provided a spring 15 which elastically urges the ferrule 12 toward the front side of the plug body 1.

Further, the MPO type plug body 1 includes a housing 18 with a spring receiving recess 17, a cylindrical coupling 13 which is externally fitted in a slidable manner within a movable range reserved in an axial direction thereof with respect to the housing 18, and is elastically urged toward the front side of the plug body 1 by the action of a spring 16 received in the recess 17 of the housing 18. a spring bush 11 which is attached to the rear end opposed to the front end at which the ferrule 12 of the housing 18 is provided, and a boot 19 which is externally inserted into the rear end of the spring bush 11.

It is configured such that fitting of the plug body 1 to an adaptor 21 is carried out by inserting a portion positioned in a rearward direction of the coupling 13 in the plug body 1, e.g. the boot 19 toward the adaptor 12 with a finger of an operator.

Meanwhile, it is configured such that extraction of the plug body 1 from the adaptor 21 is carried out by pulling in the coupling 13 to the boot 19 side against an elastic urging force of the spring 16.

For example, as shown in FIG. 17B, when the end side of the housing 18 of the plug body 1 is first forcibly inserted into the adaptor 21, the end of the coupling 13 is pushed by an elastic engaging part 22 of the adaptor 21, and the coupling 13 is once retreated. At this time, a space 22b into which the end of the coupling 13 is entered becomes empty within the adaptor 21 and gest into a free state where the elastic engaging part 22 is free to vertically move. Therefore, inserting the plug body 1 into the adaptor 21 upwardly moves an engaging projection 22a of the elastic engaging part 22 within the space 22b and gets into a state where the plug body 1 can be engaged with the adaptor 21.

However, when the plug body 1 is forcibly pulled out in this state, the engaging projection 22a of the elastic engaging part 22 upwardly moves within the space 22b at this rate, resulting in that the adaptor 21 easily comes off. Then, the space 22b is closed by advancing the coupling 13 to block up the space 22b.

Thus, the coupling 13 is engaged with a spring stopper 13b as is already mentioned, and is urged t all the time toward the font side of the housing 18 by the action of the spring 16 received in the recess 17. Therefore, the coupling 13 is kept in condition of being held at an advance position. This shields and holds the space 22b of the elastic engaging part 22 of the adaptor 21 by the end of the coupling 13, and prevents upward movement of the engaging projection 22a. Therefore, an engaging convex portion 31 of the plug body 1 is engaged with the elastic engaging part 22 of the adaptor 21, thereby preventing the plug body 1 is being pulled out therefrom.

When the plug body 1 is removed, the coupling 13 is forcibly retreated from a state where the coupling 13 is held at an advancing position by hooking a finger on the coupling 13 to put a space 22b within the adapter 21 for receiving the end of the coupling 13 into a free state.

Namely, when the coupling 13 is slid backwardly, a hooking part 31a in a state where the engaging projection 22a of the elastic engaging part 22 of the adaptor 21 is engaged and the engaging convex part 31 are exposed. When the plug body 1 is forcibly pulled out therefrom in this state, the engaging projection part 22a of the elastic engaging part 22 which bits into the hooking part 31a, and is engaged with the engaging convex part 31 gets over the engaging convex part 31 and is released while expanding by virtue of the space 22b.

After the plug body 1 is pulled out from the adaptor 21, a finger is taken off from the coupling 13, thereby elastically advancing and returning the coupling 13 to an initial position by the action of the spring 16.

Recently, as shown in FIG. 16, under the circumstances where the densification of a communication system in the various data centers has become essential, insertion of the plug body 1 into the adaptor 21 by inserting a finger one by one or a pulling operation (disengaging operation) takes troublesome labor and great amounts of time, and therefore makes workability thereof very worse.

Conventionally, a disengaging operation of the plug body 1 has been heretofore prevailing using a tab in order to improve the efficiency of a pulling-in operation or a pulling-out operation (disengaging operation) of a number of plug bodies 1.

In other words, as a tab of this kind, the tab is provided at its end with a U-shaped cover-like tab body and at its rear end with gripping member. The tab body is fitted at the outer side of the coupling 13 of the plug body 1 and the tab body is moved back and forward by operating the grasping member. Thereby, the plug body 1 is subjected to a disengaging operation together with the coupling 13 from the adaptor 21.

Specifically, as shown in PATENT LITERATURE 1 and PATENT LITERATURE 2, the optical connector adaptor is publicly known in which the tab body is formed into a substantially U-shape and the coupling 13 is internally fitted from an insertion opening.

Moreover, as shown in PATENT LITERATURE 3, the optical connector tab is publicly known in which a tab body is made of spring member having a thin sheet chevron shape whose tab body is bifurcated, and left and right outer wall surfaces of the coupling 13 are clamped by the spring member.

CITATION LIST

Patent Literature

PATENT LITERATURE 1: U.S. Pat. No. 9,052,474
PATENT LITERATURE 2: U.S. Pat. No. 9,239,437
PATENT LITERATURE 3 U.S. Pat. No. 9,103,996

SUMMARY OF INVENTION

Technical Problem

However, in the PATENT LITERATURE 1 and PATENT LITERATURE 2, there are still problems in that since the tab body is fitted in a manner of covering almost the whole outer side of the plug body (MPO plug), the entire tab body inevitably grows in size. For this reason, the overall dimensions of the optical connector at the time of the attachment of the tab becomes large and complicated, which invites a wasted space and cost up.

Further, in the case of the above-mentioned PATENT LITERATURE 3, the tab body at the end which is made of the thin sheet spring member is attached so as to clamp the tab body from the both sides of the plug body. However, there are still problems that since a hole portion at the end of the spring member is fitted to a projection at the both sides of the plug body, the spring member produces a weak attaching force and is likely to be easily came off.

The present invention is made in view of the above circumstances existing in the above PATENT LITERATURES 1-3, and an object thereof is to provide a tab for optical connecter which is capable of achieving effective use of a space and cost down by downsizing the dimensions of the tab at the time of the attachment of the tab under the circumstance of the densification of a communication system such as various data centers, and securing a sufficient attaching force to the coupling. Further, the present invention allows the tab body to be prevented from being inclined during the disengagement, and well-balanced attachment and detachment of the tab to and from the coupling.

Solution to Problem

In order to solve the above technical problems, the present invention includes a tab for optical connector for engaging and disengaging an optical connector plug with and from an adapter including a ferrule; a housing which receives at its end the ferrule, a coupling which is externally fitted in a slidable manner in forward and backward directions onto the housing; and is elastically urged all the time in a forward direction, and a spring bush which is internally inserted into the rear end of the housing, engagement with an elastic engaging part within the adapter being held by advancing the coupling, and engagement with the elastic engaging part within the adapter being disengaged by retreating the coupling to allow the optical connector plug to be pulled out, the tab for optical connector comprising: operating member which is provided at its end with a plurality of arms (5) so as to detachably attach and hold in each of a plurality of engaging holes (13a) formed at the rear end of the coupling; and gripping member which is extendingly provided from the back of the operating member, wherein the coupling advances or retreats with respect to the housing by an operation of the operating member n association with the advance and retreat of the gripping member, and forward pressing or backward pressing of the optical connector plug is released.

Further, the respective arms are provided at predetermined intervals in vertical and horizontal directions so as to present a substantially U-shape when viewed from the both plan and side views in order for the arms to insert into the inside of the coupling of the optical connector plug and hold therein.

Furthermore, the respective arms comprise an engaging part (5a) which presses the rear end of the coupling and disengageably engages in the engaging holes from the inside of the coupling after advancing the coupling, and an pressing part which presses the rear end of the optical connector plug excluding the coupling, and disengageably engages with the adapter after advancing the optical connector plug.

Moreover, the arms (5) have at least four arms in total.

The engaging part at a tip of the respective arms is formed of an engaging claw which is provided at the tip of the arms in vertical and horizontal directions with the engaging claw outwardly facing each other.

The engaging claw of the engaging part presses the rear end of the coupling, and is provided at the tip of the arms so as to engage in the engaging holes of the coupling, and the pressing part is provided in the back at predetermined intervals in the middle of the arms so as to press the optical connector plug simultaneously with engageable insertion of the engaging claw of the engaging part.

The pressing part of the respective arms is formed of a pressable pressing projection whose end abuts against a portion other than the coupling of the optical connector plug.

The operating member is folded and linked in a substantially chevron shape at the end of the gripping member, arranged at a lower position with respect to the griping member, and provided at a lower portion a curved inserting part (6) so as to linearly hold up to the multi-core optical fiber cord at the rear end of the optical connector plug.

A folding adjustment material such as a wire is inserted into the gripping member which is extendingly provided at the rear end of the operating member or into the inside of the gripping member which is extendingly provided at the rear end of the operating member through intermediate member.

The griping member is provided at the lower side thereof holding part which holds the multi-core optical fiber code at the rear end of the optical connector plug.

According to the present invention, the invention provides effective use of the space and cost down by downsizing the dimensions of the tab at the time of the attachment of the tab under the circumstances of the communication system such as the various data centers, and secures a sufficient attaching force to the coupling. Further, the present invention allows the tab body to be prevented from being inclined during the disengagement, and well-balanced attachment and detachment of the tab to and from the coupling.

Namely, the present invention includes a tab for optical connector for engaging and disengaging an optical connector plug with and from an adapter including a ferrule; a housing which receives at its end the ferrule, a coupling which is externally fitted in a slidable manner in forward and backward directions onto the housing; and is elastically urged all the time in a forward direction, and a spring bush which is internally inserted into the rear end of the housing, engagement with an elastic engaging part within the adapter being held by advancing the coupling, and engagement with the elastic engaging part within the adapter being disengaged by retreating the coupling to allow the optical connector plug to be pulled out, the tab for optical connector comprising: operating member which is provided at its end with a plurality of arms so as to detachably attach and hold in each of a plurality of engaging holes formed at the rear end of the coupling; and gripping member which is extendingly provided from the back of the operating member, wherein the coupling advances or retreats with respect to the housing by an operation of the operating member in association with the advance and retreat of the gripping member, and forward pressing or backward pressing of the optical connector plug is released.

Thus, present invention allows the easy provision of the tab for optical adaptor which achieves the downsizing of the dimensions at the time of the attachment of the tab, as well as effective use of the space and cost down.

The respective arms are provided at predetermined intervals in vertical and horizontal directions so as to present a substantially U-shape when viewed from the both plan and side views in order for the arms to insert into the inside of the coupling of the optical connector plug and hold therein.

This allows attachment and disengagement of the arms to and from the optical connector plug from the inside of the coupling, thereby enabling an easy and smooth operation even in the case of a narrow space due to the densification.

The respective arms comprise an engaging part which presses the rear end of the coupling and disengageably engages in the engaging holes from the inside of the coupling after advancing the coupling, and an pressing part which presses the rear end of the optical connector plug excluding the coupling, and disengageably engages with the adapter after advancing the optical connector plug.

This improves the strength of the whole arm.

The arms have at least four arms in total.

This enables the tab body to be prevented from being inclined during the disengagement from the adaptor, and well-balanced attachment and detachment of the tab to and from the coupling.

The engaging part at a tip of the respective arms is formed of an engaging claw which is provided at the tip of the arms in vertical and horizontal directions with the engaging claw outwardly facing each other.

This secures a sufficient attaching force to the coupling.

The engaging claw of the engaging part presses the rear end of the coupling, and is provided at the tip of the arms so as to engage in the engaging holes of the coupling, and the pressing part is provided in the back at predetermined intervals in the middle of the arms so as to press the optical connector plug simultaneously with engageable insertion of the engaging claw of the engaging part.

This allows easy pressing and pressure releasing of the optical connector plug with the tab for optical connector being attached to the coupling.

The pressing part of the respective arms is formed of a pressable pressing projection whose end abuts against a portion other than the coupling of the optical connector plug.

This allows exact and reliable pressing and pressure releasing of the optical connector plug with the aid of the pressing projection.

The operating member is folded and linked in a substantially chevron shape at the end of the gripping member, arranged at a lower position with respect to the griping member, and provided at a lower portion a curved inserting part (6) so as to linearly hold up to the multi-core optical fiber cord at the rear end of the optical connector plug.

This securely holds the optical cord without bending along the lower side of the gripping member at the just behind of the inserting part.

A folding adjustment material such as a wire is inserted into the gripping member which is extendingly provided at the rear end of the operating member or into the inside of the gripping member which is extendingly provided at the rear end of the operating member through intermediate member.

This allows exact and reliable folding adjustment of the gripping member of the tab following a bending direction of the multi-core optical fiber cord.

The griping member is provided at the lower side thereof holding part which holds the multi-core optical fiber code at the rear end of the optical connector plug.

This allows firm fixation and holding of the multi-core optical fiber cord without loosely hanging the rear end of the multi-core optical fiber cord at the time of the attachment of the tab.

BRIEF DESCRIPTION OF DRAWINGS

FIGS. 2A and 2B show one embodiment of the tab for optical connector, in which FIG. 2A is a front view, and FIG. 2B is a rear view;

FIGS. 3A and 3B show one embodiment of the tab for optical connector, in which FIG. 3A is a plan view, and FIG. 3B is a bottom view;

FIGS. 4A and 4B show one embodiment of the tab for optical connector, in which FIG. 4A is a right side view, and FIG. 4B is a left side view;

FIGS. 5A, 5B and 5C show the tab for optical connector in use, in which FIG. 5A is a plan view, FIG. 5B is a bottom view, and FIG. 5C is a right side view;

FIGS. 7A, 7B and 7C show the tab for optical connector in a variation of the present invention, in which FIG. 7A is a plan view, FIG. 7B is a side view, and FIG. 7C is a rear view;

FIGS. 8A and 8B show the tab for optical connector in use in a variation of the present invention, in which FIG. 8A is a plan view, and FIG. 8B is a side view;

FIGS. 9A and 9B show a usage state in a case where a wire internally inserted into grasping member of the tab for optical connector to allow the tab to be foldable in a variation of the present invention, in which FIG. 9A is a side view in a linear state, and FIG. 9B is a side view in a folded state;

FIGS. 10A and 10B show a state where a tip of an engaging claw abuts against the rear end of a coupling before engagement of the engaging claw at the time of the attachment thereof to the coupling of the plug body of the tab for optical connector, in which FIG. 10A is a plan view, and 10B is a side view taken along line of FIG. 10A;

FIGS. 11A and 11B show a state where the engaging claw of the tab for optical connector is inserted into an engaging holes of the coupling, in which FIG. 11A is a plan view, FIG. 11B is a sectional view taken along line B-B of FIG. 11A;

FIGS. 12A and 12B show a state where the engaging claw of the tab for optical connector abuts against the inside of the rear end of the engaging holes of the coupling, and the plug body is pulling out from the adaptor, in which FIG. 12A is a plan view, and FIG. 12B is a sectional view taken along line C-C of FIG. 12A;

FIGS. 13A and 13B show a state where a pressing part (pressing projection) of the tab for optical connection abuts against the rear end of the plug body (not touch to the coupling), and the plug body is engaged (attached to) with the adaptor, in which FIG. 13A is a plan view, and FIG. 13B is a sectional view taken along line D-D of FIG. 13A;

FIGS. 14A and 14B show a position of the pressing part (pressing projection) of the tab for optical connector where an adaptor body is pulled put from the adaptor, in which FIG. 14A is a plan view, and FIG. 14B is a sectional view taken along line E-E of FIG. 14A;

FIGS. 17A and 17B are a sectional view showing a disengaged state of an optical connector plug from the adaptor in the prior art, in which FIG. 17A is a sectional view showing a state where the plug body is attached to the adaptor by advancing the coupling, and FIG. 17B is a sectional view showing a state where the pug body is pulled out from the adaptor by retreating the coupling.

DESCRIPTION OF EMBODIMENT

Figure 1:
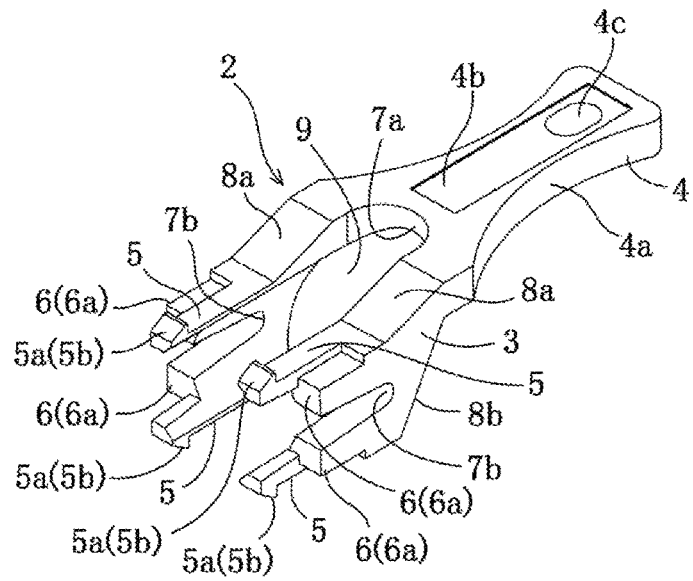
FIG. 1 is a perspective view of a tab for optical connector showing one embodiment for carrying out the present invention.
Figure 2A:
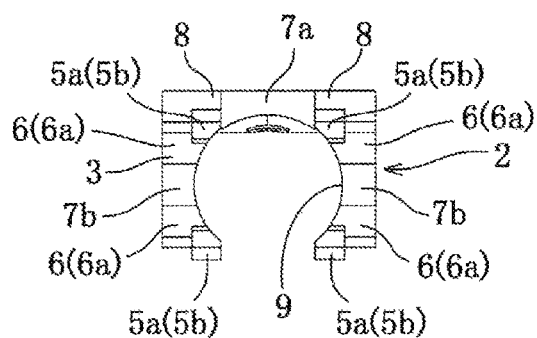
Figure 2B:
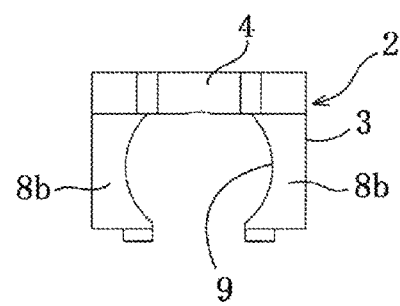
Figure 3A:
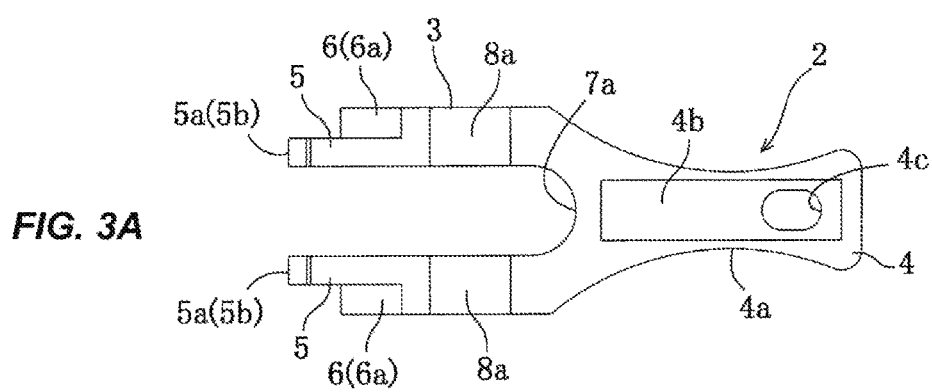
Figure 3B:
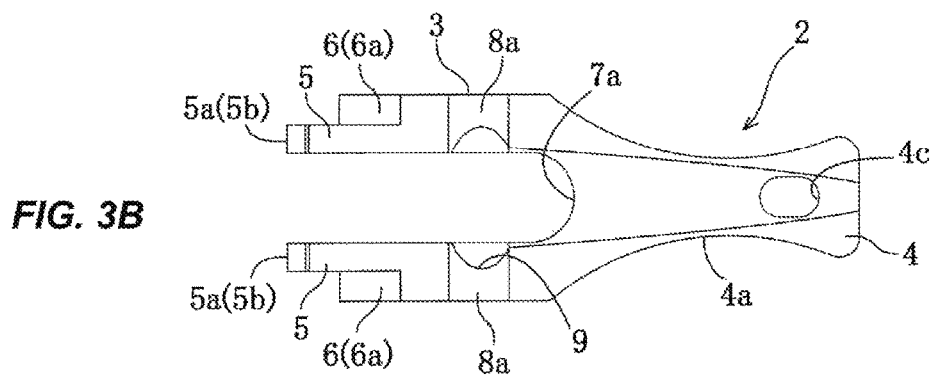
Figure 4A:
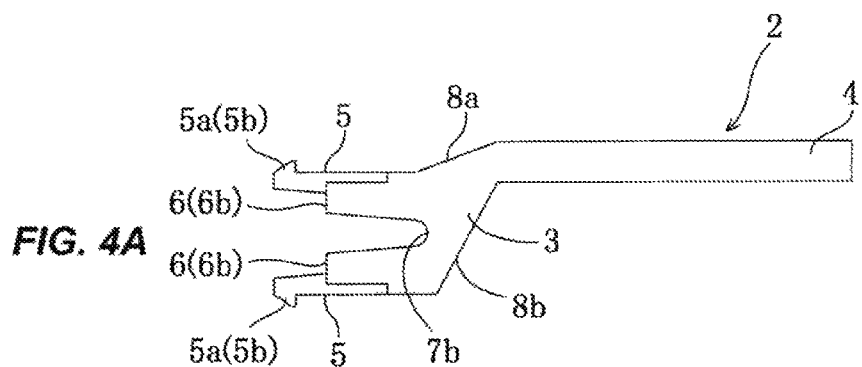
Figure 4B:
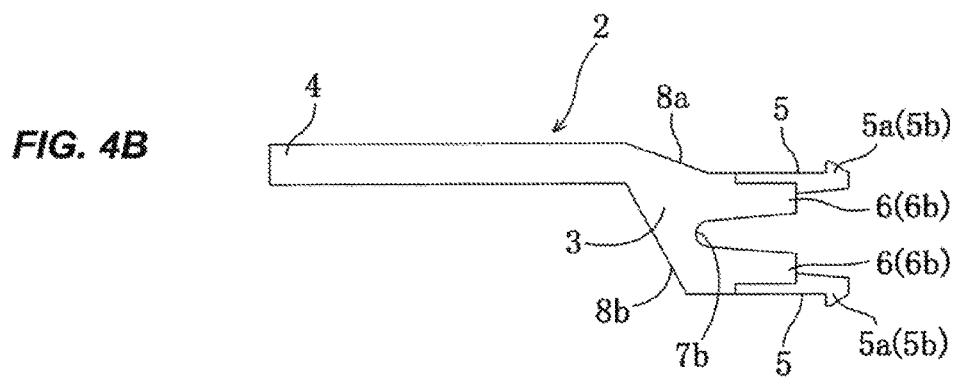
Figure 6:
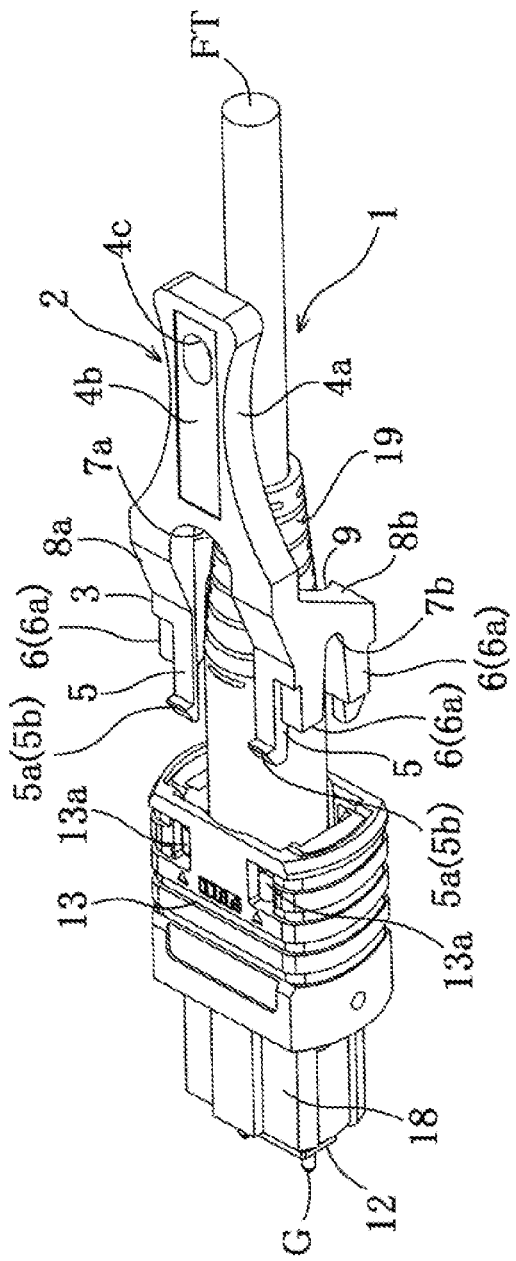
FIG. 6 is a perspective view showing a state where the tab for optical connector is connected to a plug body (coupling)
Figure 7A:
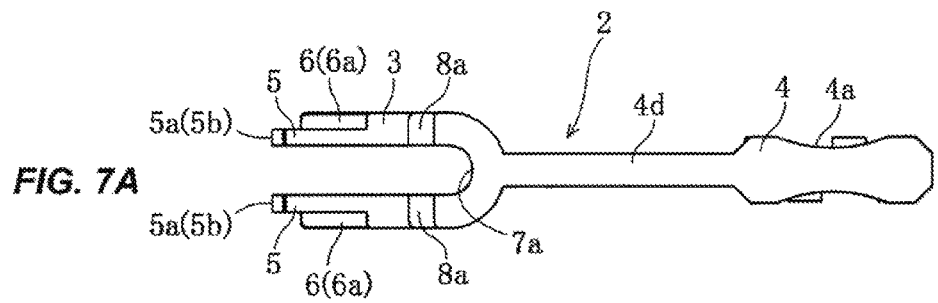
Figure 7B:
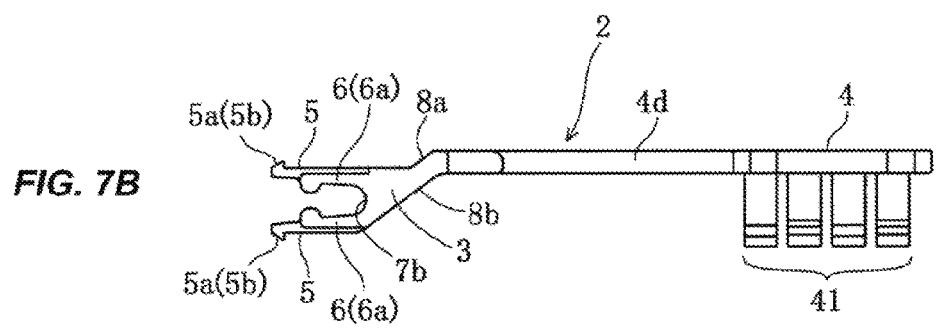
Figure 7C:
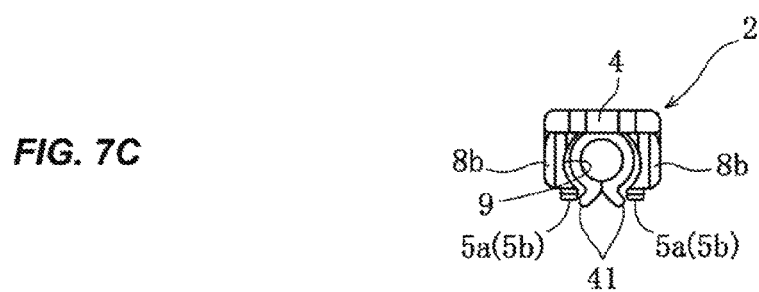

Hereinafter, a description will be given in detail of an embodiment of a tab for optical connector according to the present invention with reference to the accompanying drawings.

<Structure of Tab for Optical Connector>

As shown in FIGS. 1-6, a tab for optical adaptor 2 (hereinafter, referred to as a tab 2) according to the present invention includes operating member 3 which is provided at its tip a plurality of arms 5 (at least four in total) respectively detachably attached and held in a plurality of engaging holes 13a (see FIGS. 5A, 5B and 6) formed at the rear end of a coupling 13 of a plug body 1, and gripping member 4 which is folded and extendingly provided in a substantially chevron shape from the rear end of the operating member 3.

As shown in FIGS. 1-4A and 4B, the gripping member 4 is formed into a thin sheet finger nipping part 4a whose both left and right sides are curved inwardly. The gripping member 4 includes at its upper surface a seal sticking part 4b and a string inserting hole 4c for attaching an identification tab with a string.

As shown in FIGS. 1-4A and 4B, and 6, the respective arms 5 are provided in a protruding manner toward the front through an upper side tapered surface 8a and a lower side tapered surface 8b from the end of the gripping member 4. The arms 5 are provided at predetermined intervals in vertical and horizontal directions, through an upper side concave part 7a and a left and right sides concave part 7b, so that the respective arms 5 present a substantially U-shape when viewed from the both front and side views. Thereby, it is configured such that the substantially U-shaped opening side at the lower side is inserted into the plug body 1 from the upper and is held in a state where the plug body 1 (e.g. the boot part 19 side: see FIG. 6) is inserted into an inserting part 9 which is opened between the respective arms 5.

Further, the respective arms 5 are provided at its tip an engaging part 5a for disengageably engaging in the engaging holes 13a at the rear end of the above-mentioned coupling 13, and a pressing part 6 provided in the rear at predetermined intervals in the middle of the arms 5 to disengageably engage with the adaptor 21. Specifically, the engaging part 5a at the tip of the respective arms 5 is formed of an engaging claw 5c which is provided at the tip of the respective arms 5 in horizontal and vertical directions with the engaging claw 5c outwardly facing each other. Further, the pressing part 6 of the respective arms 5 abuts against a portion other than the coupling 13 of the plug body 1 and is formed of a pressable vertical pressing projection 6a. Meanwhile, the engaging holes 13a at the rear end of the coupling 13 is formed into a rectangular square hole long in an inserting direction and are provided four in total every two at the both upper and lower sides at the rear end of the coupling 13. Then, the dimensions of the respective engaging holes 13a in a longitudinal direction have the length to the extent that the pressing projection 6a of the pressing part 6 can be abutted against a portion at the inside of the coupling 13.

The engaging part 5a presses the rear end of the coupling 13 and disengageably engages in the engaging holes 13a from the inside of the coupling 13 after advancing the coupling 13. Further, the pressing part 6 presses the rear end (e.g., the housing 18 side or the spring bush 11 side shown in FIGS. 17A and 17B) excluding the coupling 13, and disengageably engages with the adaptor after advancing the plug body 1. In this way, the coupling 13 advances or retreats with respect to the housing 18 by an operation of the operating member 3 in association with the advance and retreat of the gripping member 4, and releases the forward pressing or the backward pressing of the plug body 1.

In this connection, the engaging part 5a and the pressing part 6 exemplary illustrated in Figs are configured at the operating member 3 as follows.

The engaging part 5a formed of the long arms 5 having at its end the engaging claw 5b is respectively arranged at the inside of the engaging part 5a, whereas the pressing part 6 is respectively arranged at the outside of the engaging part 5a. At this time, the pressing part 6 positioned at an upper portion of the operating member 3 is integrally juxtaposed at a lower position by slightly providing a step in an outer surface of the engaging part 5a positioned in like manner at an upper portion. Meanwhile, the pressing part 6 positioned at a lower portion of the operating member 3 is integrally juxtaposed in like manner at a higher portion of an outer surface by slightly providing a step in an outer surface of the engaging part 5a positioned in like manner at the upper portion.

However, note that the engaging part 5a and the pressing part 6 of the operating member 5 are not necessarily limited to the above-mentioned structure, e.g. they may be one juxtaposed in parallel as long as it has a function of inserting and extracting the plug body 1 into and from the optical adaptor 21. Alternatively, the engaging part 5a may be one in which the pressing part 6 is provided at a lower portion of the engaging part 5a.

<Structure of Optical Connector Plug>

Next, a description will be given of a structure of the plug body 1 to which the tab 2 according to the present invention is attached. The plug body 1 is configured by the MPO type push-pull system. Namely, as shown in FIGS. 17A and 17B, the plug body 1 includes a ferrule 12 which is attached to a head of the multi-core optical fiber cord FT, a sleeve-like housing 18 which receives at its end the ferule 12, a cylindrical coupling 13 which is slidably provided within a movable range reserved in an axial direction (backward and forward) with respect to the housing 18, a spring 15 which is received within the housing 18 and elasticity urges the ferrule 12 toward the front side of the optical connector, a spring 16 which is received in a recess formed at the housing 18 side between the coupling 13 and the housing 18, and elastically urges the coupling 13 toward the front side of the housing 18, a spring bush 11 which is internally inserted into the inside of the rear end opposed to the front end at which the ferrule 12 of the housing 18 is provided, and a boot 19 which is externally inserted into the spring bush 11.

Moreover, as shown in FIG. 17B, the plug body 1 to be connected to the adaptor 21 holds in an unremovable manner the housing 18 engaged by the elastic engaging part 22 which is provided in an opposingly protruding manner toward the opening side in left and right inner walls of the adaptor 21 by forwardly sliding (advancing) the coupling 13 attached in a slidable manner in forward and backward directions to an outer surface thereof, and that the engagement of the housing 18 with the elastic engaging part 22 of the adaptor 21 is disengaged to thereby pull out the plug body 1 from the adaptor 21 by backwardly sliding (retreating) the coupling 13.

In this context, reference numeral G shown in FIGS. 6A, 6B, 8A, 8B, 10A, 10B, 11B, 12B, 13B, and 14B denotes a guide pin inserted into the ferrule 12, and is fitted in a guide pin hole of a counterpart ferrule (not shown) for positioning (alignment of an optical axis) of the ferrule 12.

<Variation of Tab>

FIGS. 7A, 7B, 7C, 9A and 9B show a variation of the tab 2 according to the present invention. Herein, only the same reference numeral is added to the substantially same portions as the structure of the tab 2 in the above-mentioned embodiment, and therefore their detailed descriptions are omitted or simplified for the sake of brevity.

Namely, as shown in FIGS. 7A, 7B, 8A and 8B, in the instant variation, the operating member 3 is folded and extendingly connected in a substantially chevron shape at the end of the gripping member 4 through elongated tabular long intermediate member 4d. Then, the operating member 3 is arranged at a lower position with respect to the gripping member 4 (intermediate member 4d) in the same way as above. Also, there is provided at a lower portion of the gripping member 4 a curved holding part 41 so that the multi-core optical fiber cord FT of the plug body 1 attached at the end of the operating member 3 can be held in a linear fashion up to the gripping member 4.

Thus, in the instant variation, it is configured such that the tab 2 can be followed in a bending direction of the multi-core optical fiber cord FT. For example, as shown in FIGS. 9A and 9B, ingenuity is exerted in that a bending direction of the multi-core optical fiber cord FT can be freely controlled by inserting folding adjustment member 42 such as a wire into the inside of the intermediate member 4d. In this case, the variation is not necessarily limited to the MPO plug and may be applied, instead thereof, to a plug such as e.g. LC and SC plugs.

In the instant variation, the structure is the same as the above illustrated embodiment in that the engaging claw 5b is provided, as the engaging part 5a, at tip of the respective arms 5 of the operating member 3, and that the pressing projection 6a (but, the end is formed into a round shape in the instant variation) is integrally juxtaposed, as the pressing part 6, at a rear position thereof.

Next, a description will be given in detail of one example of usage and operation of the embodiment thus configured as above with reference to the accompanying FIGS. 10A, 10B-15,17A and 17B. Herein, a description is will be given in this case assuming that the tab 2 is previously attached to the boot 19 side of the plug body 1.

As shown in FIGS. 10A and 10B, the end of the engaging part 5a (engaging claw 5b) provided at the tip of the arms 5 of the tab 2 first abuts against the rear end of the coupling 13 of the plug body 1.

Then, as shown FIGS. 11A and 11B, the plug body 1 to which the tab 2 is attached is inserted into the inside of the adaptor 21. At this time, the engaging claw 5b of the engaging part 5a provided at the end of the tab 2 presses the rear end of the coupling 13 and advances the coupling 13. After that, the engaging claw 5b is engageably inserted into the engaging holes 13a from the inside of the coupling 13. Further, the pressing projection 6a of the pressing part 6 presses the rear end (e.g., the housing 18 side or the spring bush 11 side shown in FIGS. 17A and 17B) of the plug body 1 excluding the coupling 13.

Figures 13A, 13B:
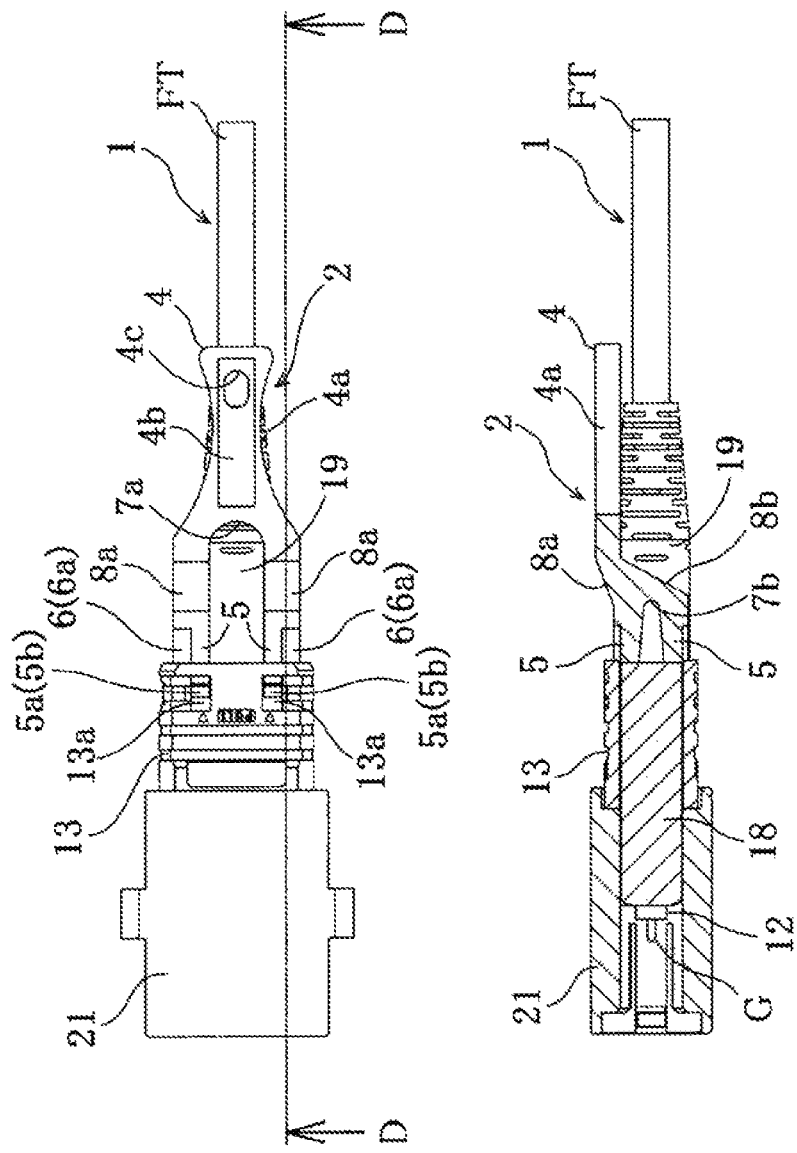

Namely, as shown in FIG. 13A, the pressing projection 6a of the pressing part 6 of the tab 2 abuts against the rear end of the pug body 1 (not contact to the coupling 13), and the plug body 1 is engaged and attached with and to the adapter 21. In the meantime, as shown in FIGS. 12A and 12B, when the plug body 1 is pulled out from the adapter 21, the engaging claw 5b of the engaging part 5a of the tab 2 abuts against the inside of the rear end of the engaging holes 13a of the coupling 13 to backwardly pull out the tab 2.

At this time, the coupling 13 is forced to retreat (the coupling 13 is backwardly slid) by pulling out the tab 2, and the hooking part 31a in a state where the engaging projection 22a of the elastic engaging part 22 of the adapter 21 is being engaged is exposed. When the tab 2 is forcibly pulled out together with the plug body 1 in this state, the engaging projection 22a of the elastic engaging part 22 which has been engaged with the hooking part 31a gets over the engaging convex 31 and is released. After that, the coupling 13 gets into a free state, and therefore the coupling 13 forwardly slides and returns to an initial position by the action of the spring 13 (see FIG. 17B).

As shown in FIGS. 14A and 14B, when the plug body 1 is pulled out from the adapter 21, a position of the pressing projection 6a goes away from the rear end of the plug body 1 excluding the coupling 13 in a backward direction of the pressing part 6 of the tab 2.

Figure 15:
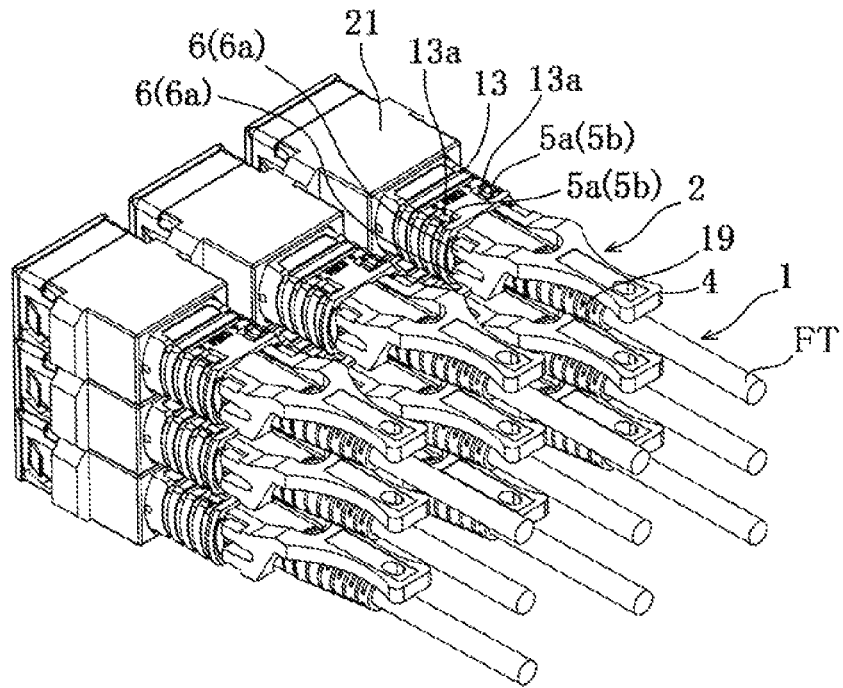
FIG. 15 is a perspective view showing a usage state of the tab for the optical connector to the adaptor on the occasion of the densification of the optical connector according to the present invention.
Figure 16:
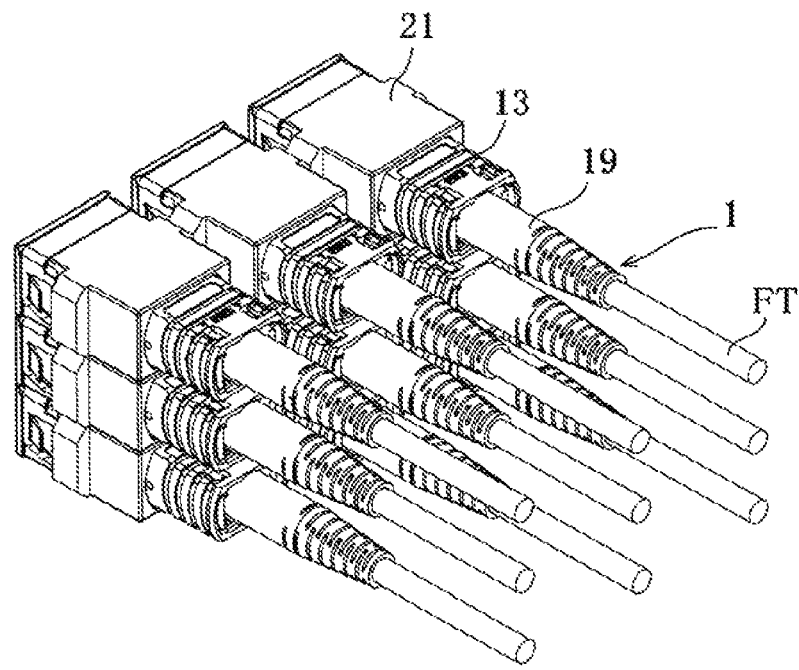
FIG. 16 is a sectional view showing a state where the plug body is attached to the adaptor on the occasion of the densification of the optical connector in the prior art.

As mentioned in the above, in the present embodiment, the insertion and extraction of the plug body 1 into and from the adapter 21 are carried out by a push-pull operation of the tab 2. Accordingly, as shown in FIG. 15, under the condition of the densification of the communication system of the various data centers, the present invention allows effective use of the space and cost down as well as secures a sufficient attaching force to the coupling 13. Moreover, the present invention prevents the tab 2 from being inclined during the insertion and extraction thereof, thereby enabling well-balanced attachment and detachment of the tab 2 to and from the coupling 13.

REFERENCE SIGNS LIST

FT: multi-core optical fiber cord
G: guide pin
1: plug body
2: tab
3: operating member
4: gripping member
4a: finger nipping part
4b: seal sticking part
4c: string inserting hole
4d: intermediate member
5: arm
5a: engaging part
5b: engaging claw
6: pressing part
6a: pressing projection
7a: upper side concave
7b: left and right sides concave
8a: upper side tapered surface
8b: lower side tapered surface
9: inserting part
11: spring bush
12: ferrule
13: coupling 13a: engaging holes
13b: stopper
15: spring
16: spring
17: recess
18: housing
18a: engaging projection
19: boot
21: adapter
22: elastic engaging part
22a: engaging projection
22b: space
31: engaging convex
31a: hooking part
41: holding part
42: folding adjustment part

The invention claimed is:

1. A tab for optical connector for engaging and disengaging an optical connector plug with and from an adapter including a ferrule; a housing which receives at its end the ferrule, a coupling which is externally fitted in a slidable manner in forward and backward directions onto the housing; and is elastically urged all the time in a forward direction, and a spring bush which is internally inserted into the rear end of the housing, engagement with an elastic engaging part within the adapter being held by advancing the coupling, and engagement with the elastic engaging part within the adapter being disengaged by retreating the coupling to allow the optical connector plug to be pulled out, the tab for optical connector comprising:
operating member which is provided at its end with a plurality of arms so as to detachably attach and hold in each of a plurality of engaging holes formed at the rear end of the coupling; and
gripping member which is extendingly provided from the back of the operating member,
wherein the coupling advances or retreats with respect to the housing by an operation of the operating member in association with the advance and retreat of the gripping member, and forward pressing or backward pressing of the optical connector plug is released.

2. The tab for optical connector according to claim 1, wherein the respective arms are provided at predetermined intervals in vertical and horizontal directions so as to present a substantially U-shape when viewed from the both plan and side views in order for the arms to insert into the inside of the coupling of the optical connector plug and hold therein.

3. The tab for optical connector according to claim 2, wherein the respective arms comprise an engaging part which presses the rear end of the coupling and disengageably engages in the engaging holes from the inside of the coupling after advancing the coupling, and an pressing part which presses the rear end of the optical connector plug excluding the coupling, and disengageably engages with the adapter after advancing the optical connector plug.

4. The tab for optical connector according to claim 1, wherein the respective arms comprise an engaging part which presses the rear end of the coupling and disengageably engages in the engaging holes from the inside of the coupling after advancing the coupling, and an pressing part which presses the rear end of the optical connector plug excluding the coupling, and disengageably engages with the adapter after advancing the optical connector plug.

5. The tab for optical connector according to claim 4, wherein the engaging part at a tip of the respective arms is formed of an engaging claw which is provided at the tip of the arms in vertical and horizontal directions with the engaging claw outwardly facing each other.

6. The tab for optical connector according to claim 5, wherein the engaging claw of the engaging part presses the rear end of the coupling, and is provided at the tip of the arms so as to engage in the engaging holes of the coupling, and the pressing part is provided in the back at predetermined intervals in the middle of the arms so as to press the optical connector plug simultaneously with engageable insertion of the engaging claw of the engaging part.

7. The tab for optical connector according to claim 4, wherein the pressing part of the respective arms is formed of a pressable pressing projection whose end abuts against a portion other than the coupling of the optical connector plug.

8. The tab for optical connector according to claim 1, wherein the arms have at least four arms in total.

9. The tab for optical connector according to claim 1, wherein the operating member is folded and linked in a substantially chevron shape at the end of the gripping member, arranged at a lower position with respect to the griping member, and provided at a lower portion a curved inserting part so as to linearly hold up to the multi-core optical fiber cord at the rear end of the optical connector plug.

10. The tab for optical connector according to claim 1, wherein a folding adjustment material such as a wire is inserted into the gripping member which is extendingly provided at the rear end of the operating member or into the inside of the gripping member which is extendingly provided at the rear end of the operating member through intermediate member.

11. The tab for optical connector according to claim 1, wherein the griping member is provided at the lower side thereof a holding part which holds the multi-core optical fiber code at the rear end of the optical connector plug.

* * * * *